J. AUTEN.
Thill-Coupling.
No 66,772.
Patented July 16, 1867.
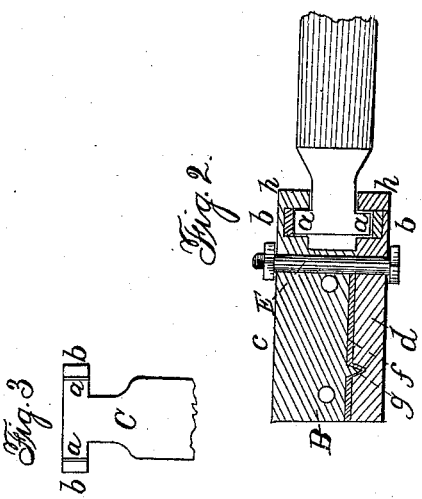
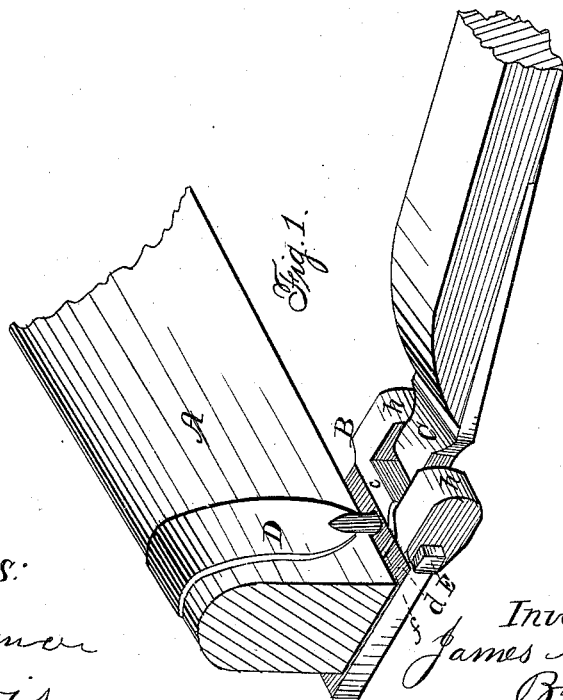
Witnesses:
Chas. H. Spencer
J. A. Davis
Inventor:
James Auten
By J. Fraser & Co.
Atty.

United States Patent Office.

JAMES AUTEN, OF CHILI, NEW YORK.

Letters Patent No. 66,772, dated July 16, 1867.

IMPROVEMENT IN THILL-COUPLINGS.

*The Schedule referred to in these Letters Patent and making part of the same.*

TO ALL WHOM IT MAY CONCERN:

Be it known that I, JAMES AUTEN, of Chili, in the county of Monroe, and State of New York, have invented a certain new and useful Improvement in Thill-Couplings for Carriages; and I do hereby declare that the following is a full and exact description thereof, reference being had to the accompanying drawings, making part of this specification.

Figure 1 is a perspective view of my improved coupling.

Figure 2, a central horizontal section of the same.

Figure 3, a diagram, showing the rubber blocks at the ends of the bearings of the thills.

Like letters of reference indicate corresponding parts in all the figures.

My invention consists in the combination, with a clip or coupling-iron, made in two parts, and secured by a bolt, of rubber blocks resting at the ends of the bearings of the thill-shank, and of a yielding packing between the parts composing the clip, the whole operating in such a manner as to keep the parts tight, avoid rattling, and reduce wear.

As represented in the drawings, A is the axle, B the clip or coupling-iron, C the thill-shank that couples thereto, and D the loop that holds the parts to the axle. The clip is made in two parts, $c$ $d$, which are coupled together by a screw-bolt, E, in front, and a nib, $g$, in the rear. Between the parts thus joined is placed an elastic packing, $f$, as shown. In the jaws $h$ $h$ of the clip are made sockets, in which fit bearings $a$ $a$ of the thill-shank C. Small blocks of India rubber are placed in the sockets, resting against the ends of the bearings, as shown most clearly in figs. 2 and 3.

A clip or coupling-iron made in two parts, joined by a bolt, and having bearings of the thill-shank resting in the sockets, has before been known; but in such case the ends of the bearings are made conical, and no packing or rubber is employed. The difficulty in such a device is that the ends of the bearings soon wear away, and it is impossible to keep them tight, or keep them from rattling. I obviate all difficulty of the kind by the employment of the blocks $b$ $b$ at the ends of the bearings, which I make square at the extremities instead of conical. These blocks, pressing constantly out against the bearings, obviate all rattling, and keep the parts perfectly tight at all times. At the same time the packing $f$ between the parts of the clip obviates all rattling at that point, and by its elasticity expands, and compensates for any looseness that may occur from the coupling of said parts; and not only this, but if made of considerable thickness, as shown, the tightening up of the screw-bolt will compress it, so as to compensate for wear of the bearings $a$ on the blocks $b$. In this manner I avoid rattling and wear to a great degree.

I am aware that a clip-iron made in two parts, connected by a bolt, and with bearings of the thill-shank resting in the jaws, has before been known, as shown in Patent No. 58,663. Such I do not claim.

What I claim as my invention, and desire to secure by Letters Patent, is—

The combination and arrangement of the rubber blocks $b$ $b$ and the packing $f$ with the clip, made in two parts, $c$ $d$, connected by bolt E, as shown and described and for the purpose set forth.

In witness whereof I have hereunto signed my name in the presence of two subscribing witnesses.

JAMES AUTEN.

Witnesses:
R. F. OSGOOD,
J. A. DAVIS.